April 20, 1926.  
W. A. CLAASSEN  
1,581,838
PORTABLE DRILL AND VALVE GRINDER
Filed Feb. 14, 1924      2 Sheets-Sheet 1
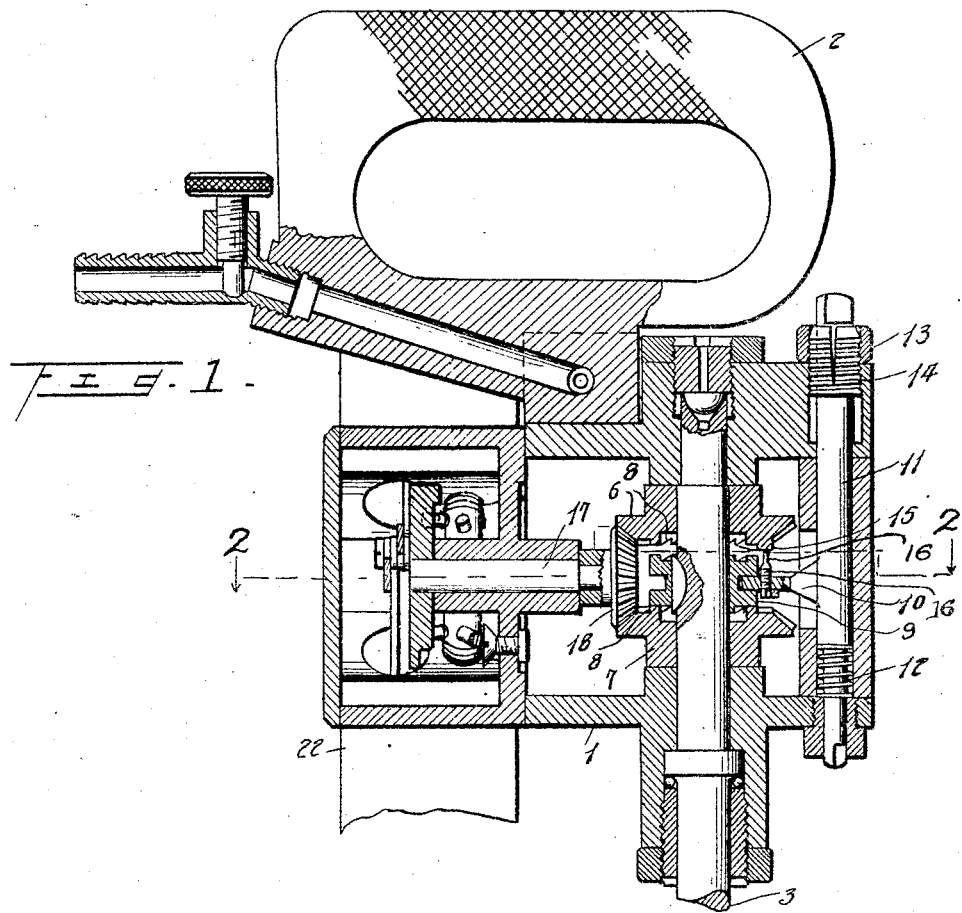
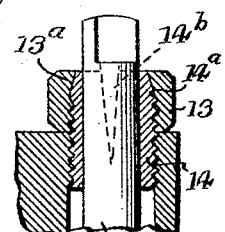
Inventor  
W. A. Claassen,
Attorney April 20, 1926.
W. A. CLAASSEN
1,581,838
PORTABLE DRILL AND VALVE GRINDER
Filed Feb. 14, 1924     2 Sheets-Sheet 2
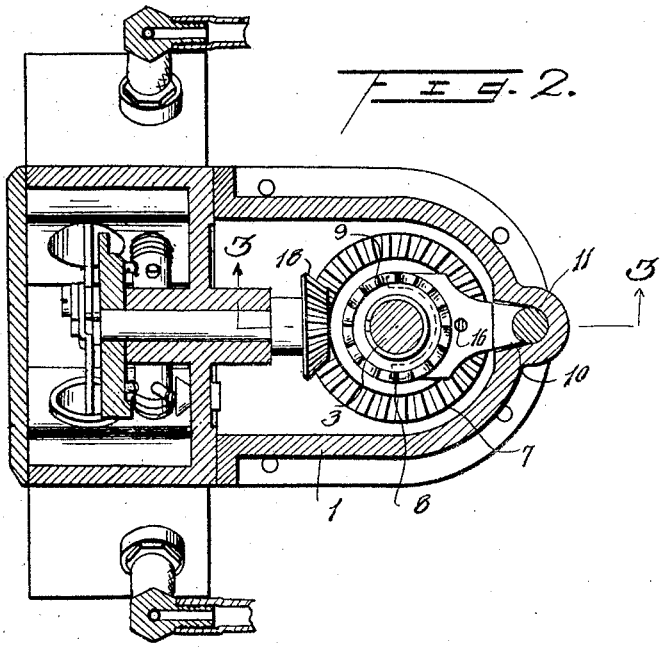
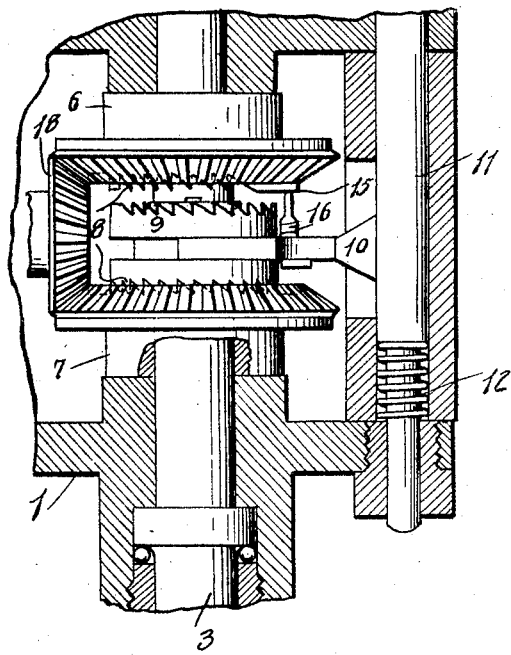
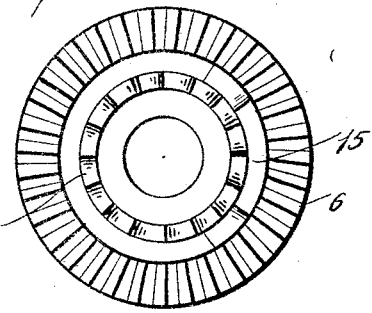
Inventor
W. A. Claassen, Patented Apr. 20, 1926.

1,581,838

UNITED STATES PATENT OFFICE.

WILLIAM A. CLAASSEN, OF WAUPACA, WISCONSIN.

PORTABLE DRILL AND VALVE GRINDER.

Application filed February 14, 1924. Serial No. 692,875.

*To all whom it may concern:*

Be it known that I, WILLIAM A. CLAASSEN, a citizen of the United States, residing at Waupaca, in the county of Waupaca and State of Wisconsin, have invented certain new and useful Improvements in Portable Drills and Valve Grinders; and I do hereby declare the following to be a full, clear, and exact description of the invention, such as will enable others skilled in the art to which it appertains to make and use the same.

This invention relates to a tool which is portable and comprises a spindle adapted to be rotated continuously in one direction for drilling, or to be intermittently rotated forwardly and backwardly when adapted for grinding a valve.

An object of the invention is the provision of a tool of the character aforesaid which is light, compact and easily controlled according to the required work in hand, the tool embodying a motor and a drive mechanism including a clutch mechanism and a control therefor, whereby the spindle may be rotated continuously or oscillated, the latter movement being effected automatically by a shifter and a cam cooperating therewith.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a sectional view of a tool embodying the invention;

Figure 2 is a sectional view taken on the plane indicated by the line 2—2 of Figure 1;

Figure 3 is a sectional view taken on the plane indicated by the line 3—3 of Figure 2;

Figure 4 is a detail view of the gear wheel provided with the cam for operating the shifter when the tool is adjusted for grinding a valve, and Figure 5 is a detail sectional view of the means by which the shifter can be secured against movement.

Corresponding and like parts are referred to in the following description and designated in the several views of the drawings by like reference characters.

The numeral 1 designates the frame of the tool which is provided with a handle 2. A spindle 3 is mounted in the frame and is adapted to have either a tool chuck fitted thereto or a valve tool, according to the adaptation of the tool for the particular work to be performed. Bevel gear wheels 6 and 7 are loose upon the spindle 3 and each is provided upon its inner face with a half clutch 8 which is adapted to coact with a corresponding half clutch of a clutch member 9 which has a feather and spline connection with the spindle 3 so as to rotate therewith but move thereon. The clutch member 9 is provided with an annular groove which, as shown in Figures 2 and 3 is engaged by the fork 10 of a shifter 11 which is loosely mounted in the frame 1 to one side of the spindle and parallel therewith. In one position of the clutch member 9, the spindle 3 is rotated in one direction and in the other extreme position of the clutch member, the spindle 3 is rotated in a reverse direction. By moving the shifter to hold the clutch member in engagement with the gear wheel 7, the spindle 3 is rotated continuously in one direction, and by adjusting the parts to admit of the alternate shifting of the clutch member 9 into engagement with the gear wheels 6 and 7, the spindle 3 will have an alternate rotary movement imparted thereto which is necessary when the tool is adapted for use as a valve grinder. The shifter 11 consists of a rod and is mounted to have a longitudinal movement and is normally pressed upwardly by means of a spring 12 and may be held when pressed downwardly by means of a contractible sleeve 14 and a sleeve contracting nut 13. The sleeve 14, which has a smooth inner surface, is externally screw threaded to receive the nut 13 and to permit it to be engaged with the frame 1, as clearly shown in Figures 1 and 5. When the sleeve 14 is not under contraction the shifter 11, the upper end of which passes through the sleeve, is free for movement in opposite longitudinal directions, and when the sleeve is under contraction the shifter is held against such movements. To permit the sleeve 14 to be contracted by means of the nut 13 when it is desired to secure the shifter 11 against longitudinal movement, the sleeve and the nut are provided with oppositely inclined smooth portions 14ª and 13ª, respectively, and the sleeve is provided with slots 14ᵇ, as clearly shown in Figures 1 and 5. When the nut 13 is turned to release the shifter 11, the same is pressed upwardly and throws the clutch member 9 into clutch engagement with the gear wheel 6, and in the rotation of the spindle a cam 15 on the gear wheel 6 engages the upper end of a screw 16 carried by the fork 10 of the shifter and moves the shifter and the clutch member, whereby to throw the latter into clutch engagement with the gear wheel 7, and as soon as the cam 15 clears the screw 16, the spring 12 moves the shifter to throw the clutch member 9 into clutch engagement with the gear wheel 6. It will thus be understood that the spindle 3 is alternately thrown into clutch engagement with the reversely driven gear wheels 6 and 7 and as a result said spindle has an alternate rotary movement imparted thereto which is essential to the successful grinding of a valve.

A shaft 17 mounted in the frame 1 and disposed at a right angle to the spindle 3, is provided at its inner end with a gear wheel 18 which is in mesh with the teeth of the gear wheels 6 and 7. A pneumatic or other suitable motor, not shown, may be used for the purpose of driving the shaft 17.

The operation of the tool is readily understood from the foregoing taken in connection with the accompanying drawings and when the tool is adapted for drilling, a chuck is fitted to the spindle 3 and the shifter 11 is adjusted to throw the clutch member 10 into clutch engagement with the gear wheel 7, the position of the shifter being fixed by tightening the nut 13. When the tool is adapted for grinding a valve, the chuck is replaced by a valve tool and the shifter 11 is released so as to be alternately moved by means of the spring 12 and cam 15, whereby to throw the clutch member 10 into clutch engagement with the gear wheels 6 and 7 in alternation so as to impart an alternate rotary movement to the spindle.

What is claimed is:

1. In a tool of the character specified, a spindle, reversely driven gear wheels loose on the spindle, one of the gear wheels being provided with a cam, a movable clutch member splined to the spindle and disposed between the gear wheels and adapted to be thrown into clutch engagement with each, a shifter in engagement with the movable clutch member, a spring normally urging the shifter towards the gear wheel provided with the cam, the latter operating to move the clutch member into clutch engagement with the opposite gear wheel, and means for securing the shifter in one of its extreme positions.

2. In a tool of the character specified, a spindle, spaced gear wheels loose upon the spindle, one of said gear wheels being provided with a cam, means for imparting a reverse rotary movement to the gear wheels, a movable clutch member splined to the spindle, a shifter loosely mounted and having a projection in engagement with the movable clutch member, a stop carried by the shifter and adapted to cooperate with the said cam, whereby to move the clutch member in one direction, a spring coacting with the shifter, and means for securing the latter in its other extreme position.

3. In a tool of the character specified, a spindle, spaced gear wheels loose upon the spindle, means for imparting a reverse rotary movement to the gear wheels, a clutch member splined to the spindle and disposed between the gear wheels, one of the latter being provided with a cam, a shifter having a projection in engagement with the movable clutch member, a stop adjustable relatively to the shifter and adapted to coact with the said cam, a spring normally urging the shifter in one direction, and means for securing the shifter when moved in a direction in opposition to the spring.

4. In a tool of the character specified, a spindle, members loose on the spindle and adapted to be reversely rotated, said members being provided at their opposing sides with clutch faces, one of the members being provided with a cam, a movable clutch member splined to the spindle between said first named members, a shifter in engagement with the movable clutch member, and a spring normally urging the shifter toward the member provided with the cam, the latter operating to move the clutch member against the tension of the spring.

In testimony whereof I affix my signature.

WILLIAM A. CLAASSEN.